(12) United States Patent
Lo et al.

(10) Patent No.: US 6,212,534 B1
(45) Date of Patent: Apr. 3, 2001

(54) SYSTEM AND METHOD FOR FACILITATING COLLABORATION IN CONNECTION WITH GENERATING DOCUMENTS AMONG A PLURALITY OF OPERATORS USING NETWORKED COMPUTER SYSTEMS

(75) Inventors: Kevin H. Lo, Newton; Richard Y. Chung, Allston; Ray Y. Chun, Revere, all of MA (US)

(73) Assignee: X-Collaboration Software Corp., Boston, MA (US)

( * ) Notice: Subject to any disclaimer, the term of this patent is extended or adjusted under 35 U.S.C. 154(b) by 0 days.

(21) Appl. No.: 09/311,515

(22) Filed: May 13, 1999

(51) Int. Cl.[7] .................................................... G06F 17/21

(52) U.S. Cl. ............................................ 707/511; 707/512

(58) Field of Search ................................... 707/500, 501, 707/511, 512; 345/329, 330, 331

(56) References Cited

U.S. PATENT DOCUMENTS

| | | | | |
|---|---|---|---|---|
| 5,008,853 | * | 4/1991 | Bly et al. | 345/329 |
| 5,870,552 | * | 2/1999 | Dozier et al. | 395/200.49 |
| 5,970,505 | * | 10/1999 | Ebrahim | 707/501 |
| 6,023,715 | * | 2/2000 | Burkes et al. | 707/514 |
| 6,061,697 | * | 5/2000 | Nakao | 707/513 |
| 6,065,026 | * | 5/2000 | Cornelia et al. | 707/531 |
| 6,067,551 | * | 5/2000 | Brown et al. | 707/203 |

* cited by examiner

Primary Examiner—Stephen S. Hong
(74) Attorney, Agent, or Firm—Richard A. Jordan

(57) ABSTRACT

A system for facilitating collaboration among a plurality of users in connection with generation of a document includes a document information store and one or more user modules. The document information store stores document information relating to documents being generated, the document information including both document structure information and document content information, the document structure information describing document structural elements for each one document and document content information comprising document content elements associated with respective document structural elements. Each user module includes a whiteboard display module, a document update module and an interface module. The whiteboard display module is configured to display a whiteboard to a user, the whiteboard selectively displaying document structure defined by the document structural elements for a document and document content information therefor. The document update module is configured to enable the user to selectively update the document structure and document content information therefor as displayed by the whiteboard display module. The interface module is configured to selectively enable the retrieval it of document information for a document and document content information as requested by said operator for display by the whiteboard display module and update of document information as stored in the document information store to be updated in response to updates received by said document update module.

81 Claims, 5 Drawing Sheets

SYSTEM AND METHOD FOR FACILITATING COLLABORATION IN CONNECTION WITH GENERATING DOCUMENTS AMONG A PLURALITY OF OPERATORS USING NETWORKED COMPUTER SYSTEMS

FIELD OF THE INVENTION

The invention relates generally to the field of digital computer systems and more particularly to systems and method for facilitating collaboration among a number of persons who may be, for example, working on a common project.

BACKGROUND OF THE INVENTION

In modern "enterprise" digital data processing systems for use in, for example, an office environment in a company, a number of personal computers, workstations, and other various network resources such as mass storage subsystems, network printers and interfaces to the public telephony system, are typically interconnected in a computer network. The personal computers and workstations are used by individual operators to perform processing in connection with data and programs that may be stored in the network mass storage subsystems. In such an arrangement, the personal computers/workstations, operating as clients, download the information, including data and programs, from the network mass storage subsystems for processing. In addition, the personal computers or workstations will enable processed data to be uploaded to the network mass storage subsystems for storage, to a network printer for printing, to the telephony interface for transmission over the public telephony system, or the like. In such an arrangement, the network mass storage subsystems, network printers and telephony interfaces operate as shared resources, since they are available to service requests from all of the clients in the network. By organizing the network in such a manner, the servers are readily available for use by all of the personal computers/workstations in the network. Networks may be spread over a fairly wide area, and may interconnect personal computers, workstations and other devices among a number of companies and individuals.

Enterprise systems as described above operate well when operators are working individually. However a number of problems arise when operators wish to collaborate in working on a common project.

SUMMARY OF THE INVENTION

The invention provides a new and improved system and method for facilitating collaboration among a number of operators in generating documents for a project.

In brief summary, the invention provides a system for facilitating collaboration among a plurality of users in connection with generation of a document includes a document information store and one or more user modules. The document information store stores document information relating to documents being generated, the document information including both document structure information and document content information, the document structure information describing document structural elements for each one document and document content information comprising document content elements associated with respective document structural elements. Each user module includes a whiteboard display module, a document update module and an interface module. The whiteboard display module is configured to display a whiteboard to a user, the whiteboard selectively displaying document structure defined by the document structural elements for a document and document content information therefor. The document update module is configured to enable the user to selectively update the document structure and document content information therefor as displayed by the whiteboard display module. The interface module is configured to selectively enable the retrieval of document information for a document and document content information as requested by said operator for display by the whiteboard display module and update of document information as stored in the document information store to be updated in response to updates received by said document update module. Since the system allows a number of users to operate the respective user modules, those users can cooperate to generate the respective documents and content therefor.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
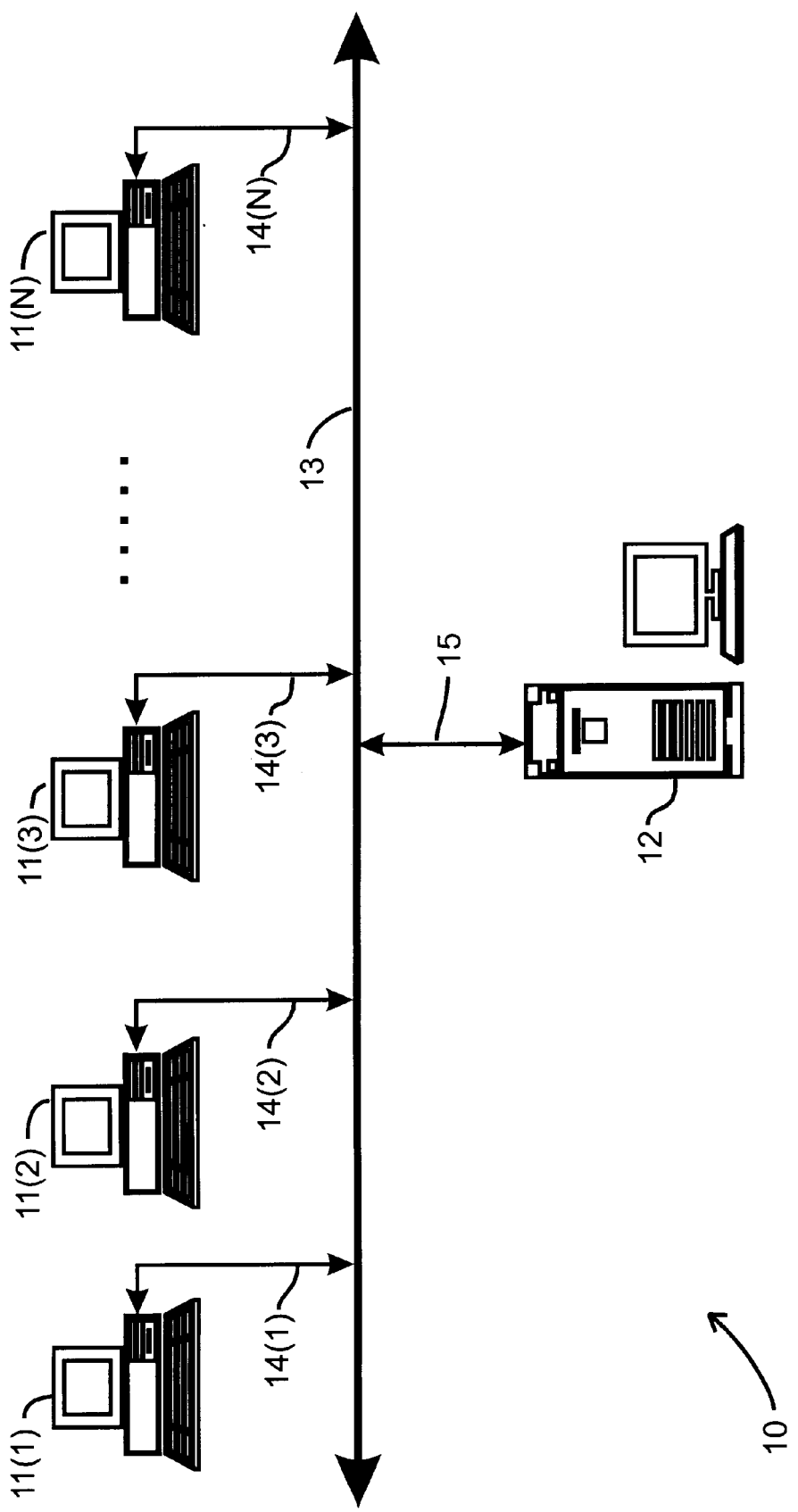
FIG. 1 is a functional block diagram of a digital computer network including a collaboration facilitation system, constructed in accordance with the invention.

FIG. 1 is a schematic diagram of a computer network including a system for facilitating collaboration among a number of operators, constructed in accordance with the invention. With reference to FIG. 1, computer network 10 includes a plurality of computers 11(1) through 11(n) (generally identified by reference numeral 11(n)) and 12 which are interconnected by a communication link 13. As is conventional, at least some of the computers 11(n) are in the form of personal computers or computer workstations, each of which includes a system unit, a video display unit and operator input devices such as a keyboard and mouse. The computer 12 also includes a system unit, and may also include a video display unit and operator input devices. The computers 11(n) and 12 are of the conventional stored-program computer architecture. A system unit generally includes processing, memory, mass storage devices such as disk and/or tape storage elements and other elements (not separately shown), including network interface devices 14(n), 15 for interfacing the respective computer to the communication link 13. A video display unit permits the computer to display processed data and processing status to the operator, and an operator input device enable the operator to input data and control processing by the computer. The computers 11(n) and 12 transfer information, in the form of messages, through their respective network interface devices 14(n), 15 among each other over the communication link 13.

In one embodiment, the network 10 is organized in a "client-server" configuration, in which at least one computer, namely, computer 12, operates as a server, and the other computers 11(n) operate as clients. Typically, the servers include large-capacity mass storage devices which can store copies of programs and data which are available for retrieval by the client computers over the communication link 13 for use in their processing operations. From time to time, a client computer 11(n) may also store data on the server computer 12, which may be later retrieved by it (the client computer that stored the data) or other client computers for use in their processing operations. The server computers may be generally similar to the client computers 11(n), including a system unit, video display unit and operator input devices and may be usable by an operator for data processing operations in a manner similar to a client computer. Alternatively, at least some of the server computers may include only processing, memory, mass storage and network interface elements for receiving and processing retrieval or storage requests from the client computers, and generating responses thereto.

The communication link 13 interconnecting the client computers 11(n) and server computer 12 in the network 10 may, as is conventional, comprise wires, optical fibers or other media for carrying signals representing information among the computers 11(n) and 12. As noted above, each of the computers 11(n) typically includes a network interface device (represented by respective arrows 14(n) and 15), which connects the respective computer to the communications link 13.

Figure 2:
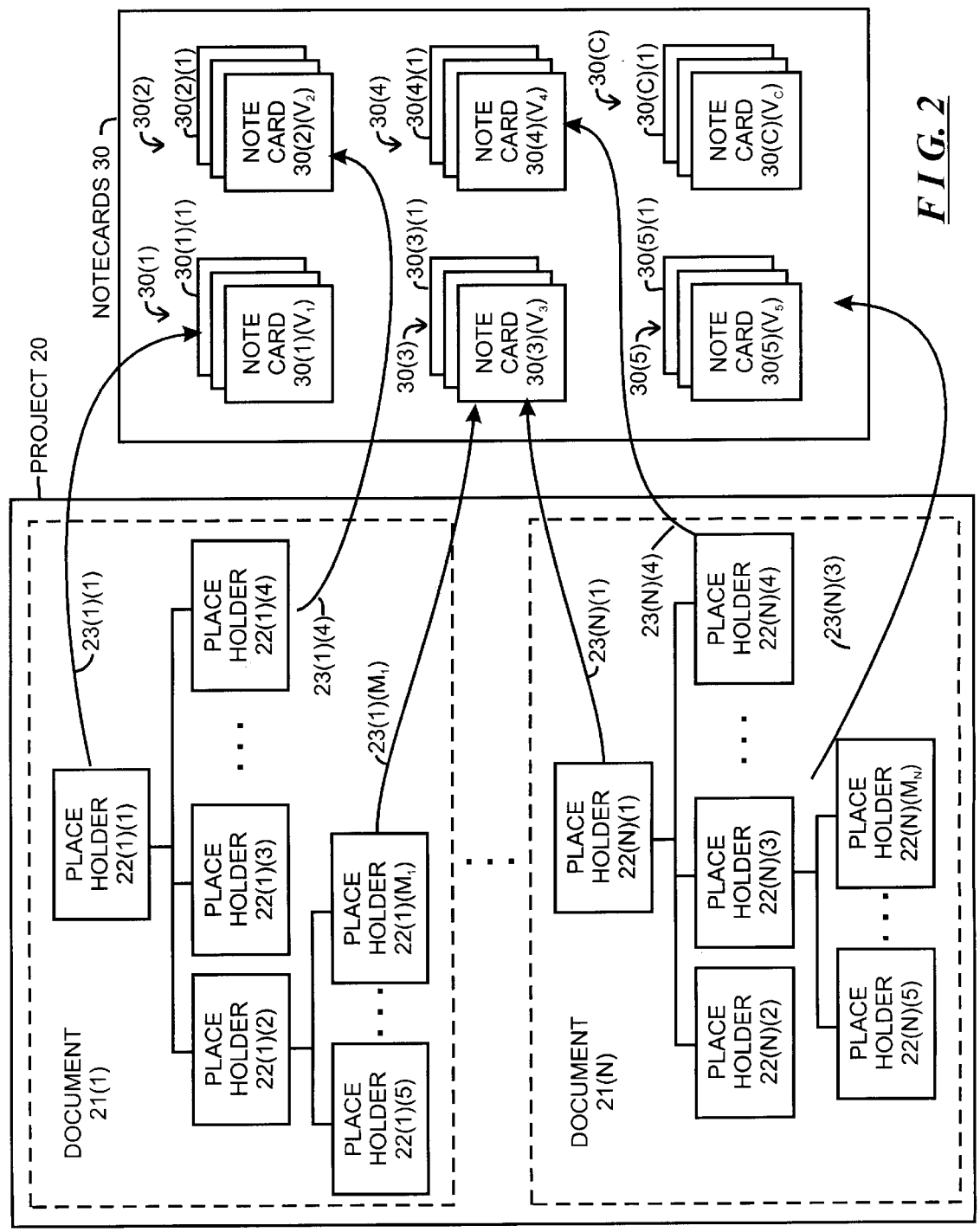
FIG. 2 schematically depicts components of a project on which a plurality of operators can collaborate using the collaboration facilitation system.

The network 10 includes a system for facilitating collaboration among a number of operators, who may be using diverse ones of the computers 11(n), in generating documents for projects on which the operators may be jointly working. Each project may be associated with a number of documents, and the documents themselves may have any of a number of types of content, including textual, graphical, video, audio, and others, which may be displayed by a video display device, printed, or the like. Each document, in turn, can be associated with a number of notecards, with each notecard being associated with an item of content for the respective document. Each notecard, on the other hand, can be associated with and form part of a number of documents. Before proceeding further, it may be helpful to describe the logical structure of a project. One such project, depicted in FIG. 2, is identified by reference numeral 20. With reference to FIG. 2, project 20 includes a plurality of documents 21(1) through 21(N) (generally identified by reference numeral 21(n)). Each document, in turn, includes one or more placeholders 22(n)(1) through 22(n)($M_n$) (generally identified by reference numeral 22(n)($m_n$)). The number of placeholders 22(n)($m_n$) associated with each document 21(n) may differ as among the various documents.

The placeholders 22(n)($m_n$) in each document 21(n) are arranged in a hierarchical organization, with the placeholders 22(n)($m_n$) effectively forming nodes of a tree, with the tree effectively representing an outline for the respective document 21(n). As depicted in FIG. 2, the various documents 21(n) comprising the project 20 may have different numbers of placeholders Lied 22(n)($m_n$) and hierarchical structures and organizations. One of the placeholders in each document, illustratively placeholder 22(1)(1) in document 21(1) and placeholder 21(N)(1) in document 21(N) form root placeholders in their respective tree structure. In the illustrative documents 21(1) and 21(N) depicted in FIG. 2, the respective root placeholder is connected to a plurality of child placeholders, namely, in the case of document 21(1), placeholders 22(1)(2) through 22(1)(4), and, in the case of document 21(N), placeholders 22(N)(2) through 22(N)(4); in that case, the root placeholders 22(1)(1) and 21(N)(1) form respective parent placeholders of placeholders 22(1)(2) through 22(1)(4) (in the case of root placeholder 22(1)(1)) and placeholders 22(N)(2) through 22(N)(4) (in the case of root placeholder 22(N)(1)). Similarly, the placeholders which form children of the placeholders 22(1)(2) through 22(1)(4) and 22(N)(2) through 22(N)(4) can have child placeholders. For example, placeholder 22(1)(2) in document 21(1) is shown has having child placeholders 22(1)(5) through 22(1)($m_1$), and placeholder 22(N)(3) in document 21(N) is shown as having child placeholders 22(N)(5) through $^{22}$(N)($m_N$). In those cases, the placeholder 22(1)(2) will comprise the parent of placeholders 22(1)(5) through 22(1)($m_1$) and placeholder 22(N)(3) will form the parent of placeholders 22(N)(5) through 22(N)($m_n$). Placeholders which have no children will be referred to herein as "leaves."

Each placeholder 22(n)($m_n$) in a document 21(n) can be associated with a notecard, generally identified by reference numeral 30, that is to be associated with the document and which will provide a content item for the document. An operator can generate respective a placeholder 22(n)($m_n$) before the notecard 30 with which that placeholder is to be associated has been generated; in that case, the placeholder 22(n)($m_n$) represents a task to be performed in connection with generation of the document, in particular, a task of generating the notecard 30 that is to be associated with the placeholder 22(n)($m_n$) at the particular location in the document. The documents 21(n) and notecards 30 are preferably stored separately from each other to simplify allowing multiple placeholders 21(n)($m_n$) to be associated with the same notecard 30, with each placeholder 22(n)($m_n$) with which a notecard 30 has been associated including a pointer, represented by arrow 31(n)($m_n$) to the respective notecard. The collaboration facilitation system used by the operators of the computers 11(n) in generating the documents 21(n) allows each notecard 30 to be generated from the respective placeholder 22(n)($m_n$), or independently of the respective placeholders 21(n)($m_n$).

The collaboration facilitation system constructed in accordance with the invention allows the various documents 21(n) associated with project 20, as well as the hierarchical structure of the placeholders 22(n)($m_n$) associated with each document, to be developed in a collaborative manner by a plurality of operators using the respective computers 11(n). In particular, each document 21(n) is constructed and updated on a "whiteboard," that is, a window that the collaboration facilitation system can, on request of an operator, enable to be displayed on the video display of the operator's computer 11(n). In particular, the collaboration facilitation system, on request from an operator operating a particular computer 11(n), enables the operator's computer 11(n) to display a whiteboard window. If the operator wishes to utilize, that is, to view or update, an existing document 21(n), the collaboration facilitation system enables the computer 11(n), to display the document 21(n) in the whiteboard window, substantially as depicted in FIG. 2. That is, the document 21(n) will be displayed as a tree of nodes, with the nodes representing the various placeholders 22(n)($m_n$) comprising the document 21(n). After the document 21(n) has been displayed, the operator, utilizing conventional operator input devices such as a mouse, keyboard or the like, can add nodes representing placeholders 22(n)($m_n$) and connect them to pre-existing nodes, disconnect nodes and delete them, change the hierarchical structure by disconnecting nodes and connecting them to other nodes, and the like. Similarly, if the document 20 is a new document, for which no nodes have been added, the operator, using the same operator input devices, can add nodes on the whiteboard window and interconnect them in a hierarchical structure. In either case, the operator can also add text and other information to each node representing a placeholder $22(n)(m_n)$ which may briefly indicate the subject matter of the content which is (in the case of a placeholder $22(n)(m_n)$ which has not yet been associated with a notecard 30) to be associated with the placeholder $22(n)(m_n)$, or which has been (in the case of a placeholder $22(n)(m_n)$ which has already been associated with a notecard 30) associated with the placeholder $22(n)(m_n)$, which the collaboration facilitation system can also display on the computer's video display associated with the respective nodes. Any operator who is authorized to work on the project 20 can establish a new document $21(n)$ or check out an existing one for updating.

Each notecard 30 represents and effectively contains a content item which may be used in a document. As noted above, the content item may comprise a textual item, information in graphical or image form, a video clip, an audio clip, or the like, or any combination thereof. Thus, a notecard can include, for example, text with an accompanying image or graph, text with a window in which video information is displayed with accompanying audio, or any combination thereof. Each notecard may be generated or updated by any operator authorized in connection with project 20 or other projects (if any) with which the notecard 30 is associated. As a notecard 30 is updated, the updated version do not over-write prior versions of the notecard, but instead are maintained along with the prior versions; effectively, each notecard 30 includes the original version, $30(1)(1)$ through $30(C)(1)$ (generally identified by reference numeral $30(c)(1)$) through the respective latest updated version $30(c)(V_c)$. By maintaining prior versions of a notecard it is possible to return to an earlier version if it is determined to discard one or more updates, to make use of information from an earlier version in an update, or the like. The notecards 30 are preferably stored separately from the documents $21(n)$ and can be referenced by placeholders $22(n)(m_n)$ in multiple documents $21(n)$ in the same project 20. For example, notecard $30(3)(V_3)$ is referenced by both placeholders $22(1)(M_1)$ and $22(N)(1)$ and will be used at both locations in the respective documents $21(1)$ and $21(n)$. Each notecard can also be referenced by placeholders in multiple projects, and will be used at respective locations in the respective documents which reference them.

The collaboration facilitation system also allows the various notecards 30 to be developed in a collaborative manner by a plurality of operators of the respective computers $11(n)$. The operator can create or update a notecard $30(c)(V_c)$ when he or she establishes a placeholder $22(n)(m_n)$ therefor, or sometime thereafter. Alternatively, the operator can create or update a notecard $30(c)(V_c)$ separate and apart from establishing a placeholder $22(n)(m_n)$ therefor. Each document $21(n)$ is constructed and updated on a "whiteboard," that is, a window that the collaboration facilitation system can, on request of an operator, enable to be displayed on the video display of the operator's computer $11(n)$. In particular, the collaboration facilitation system, on request from an operator operating a particular computer $11(n)$, enables the operator's computer $11(n)$ to display a whiteboard window. If the operator wishes to utilize, that is, to view or update, an existing document $21(n)$, the collaboration facilitation system enables the computer $11(n)$, to display the document $21(n)$ in the whiteboard window, substantially as depicted in FIG. 2. That is, the document $21(n)$ will be displayed as a tree of nodes, with the nodes representing the various placeholders $22(n)(m_n)$ comprising the document $21(n)$. After the document $21(n)$ has been displayed, the operator, utilizing conventional operator input devices such as a mouse, keyboard or the like, can add nodes representing placeholders $22(n)(m_n)$ and connect them to pre-existing nodes, disconnect nodes and delete them, change the hierarchical structure by disconnecting nodes and connecting them to other nodes, and the like. Similarly, if the document 20 is a new document, for which no nodes have been added, the operator, using the same operator input devices, can add nodes on the whiteboard window and interconnect them in a hierarchical structure. In either case, the operator can also add text or other information to each node representing a placeholder $22(n)(m_n)$ which may briefly indicate or describe, in the case of a placeholder $22(n)(m_n)$ which has not yet been associated with a notecard 30, the nature of the subject matter of the content which to be associated with the placeholder $22(n)(m_n)$, or the like. In the case of a placeholder $22(n)(m_n)$ which has already been associated with a notecard 30 associated with the placeholder $22(n)(m_n)$, the text or other information can briefly indicate or describe the nature of the subject matter of the content of the notecard 30. Similarly, in the case of a placeholder $22(n)(m_n)$ associated with a task, the text or other information can briefly indicate or describe the nature of the task, such as the operations to be performed in connection therewith. In any case, the collaboration facilitation system can display the text or other information on the computer's video display associated with the respective nodes. Any operator who is authorized to work on the project 20 can establish a new document $21(n)$ or check out an existing one for updating.

Notecards $30(c)$, in addition to providing content for document(s) $21(n)$ whose placeholder(s) $22(n)(m_n)$ reference them, can also be associated with one or more comments (not separately shown) that an operator can add to the respective notecard $30(c)$. The comments may be used to provide, for example, an extended description as to what content is to be provided in the notecard $30(c)$, the particular operator or operators who are to develop the content, comments on the content as the notecard $30(c)$ is being developed, and so forth. In one embodiment, a comment will expire a predetermined time period after it has been added, and after that time period the collaboration facilitation system server 111 can delete the comment.

Figure 3:
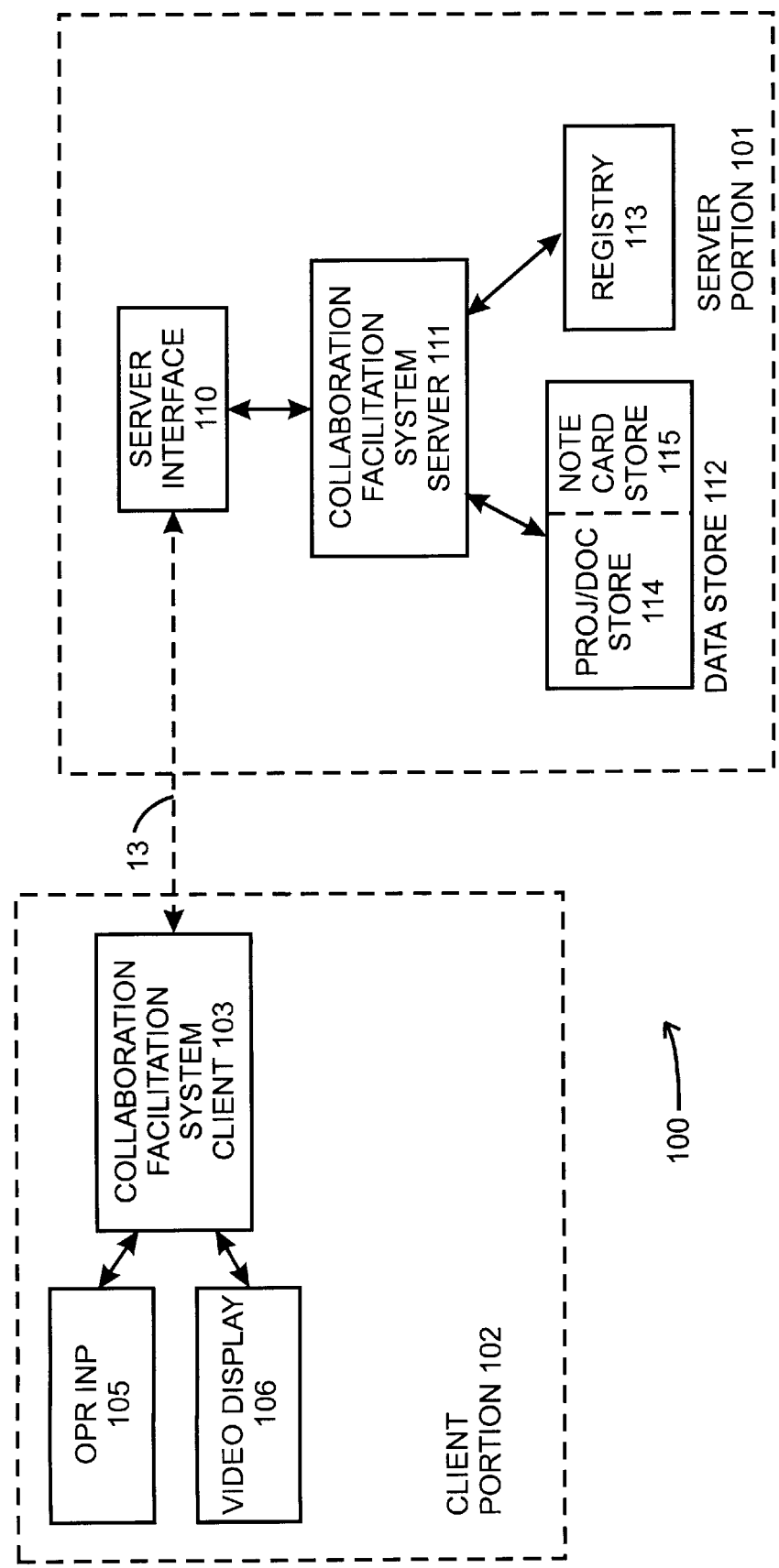
FIG. 3 depicts a functional block diagram of the collaboration facilitation system.

FIG. 3 depicts a functional block diagram of the collaboration facilitation system constructed in accordance with the invention. With reference to FIG. 3, the collaboration facilitation system, identified by reference numeral 100, includes a server portion 101 that is maintained and processed by the server computer 12, and at least one client portion 102 that is or are maintained and processed by the client computers $11(n)$ used by the operators who are authorized to work on a project 20. The client portion 102 includes a collaboration facilitation system client 103 and makes use of operator input devices 105, such as a keyboard and mouse, and a video display 106. The operator input devices 105 and video display 106 may be components which are conventionally provided with a computer such as a personal computer or workstation. The operator, using the operator input devices 105, can enable the collaboration facilitation system client 103 to request over communication link 13 information from the server portion 101 for, for example, display to the operator on the video display 106. In addition, the operator, using the operator input devices 105 can update the information provided by the server portion 101, after which the collaboration facilitation system client 103 can transmit the updated information to the server portion 101 for storage.

Details of the operation of the collaboration facilitation system client 103, particularly in connection with facilitating collaboration among a plurality of operators authorized in connection with a project, will be described below.

The server portion 101 makes use of a server interface 110, and includes a collaboration facilitation system server 111, a data store 112 and a registry 113. The server interface 111, which may be conventionally provided by the server computer 12, provides an interface for the collaboration facilitation system server 111, in particular receiving requests transmitted thereto by the client portion 102 over the communication link 13 and providing them to the collaboration facilitation system server 111, and transmitting responses generated by the collaboration facilitation system server 111 in response thereto to over communication link 13 to the client portion 102. The data store 112 stores data structures, which will be described below in connection with FIGS. 4 and 5, for the project or projects which have been established and which are maintained by the server portion 101. A server portion 101 may store information for one or more projects 20. In addition, network 10 may include one or more server computers 12 which provide plural server portions 101, each of which, in their respective data stores 112, may maintain information for one or more projects 20 which have been established for the network 10.

The data store 112 associated with one collaboration facilitation system server 111 includes a project/document store portion 114 and a notecard store portion 115. The project/document store portion 114 stores project and document information for the projects maintained by the collaboration facilitation system server 111 as generally described above in connection with FIG. 2 and as will be described below in detail in connection with FIG. 4. The notecard store portion 115 stores information for the respective notecards 30(*c*), also as generally described above in connection with FIG. 2 and as will be described below in detail in connection with FIG. 5.

The registry 113 provides identification information for the various operators who may be authorized to work on the projects which are maintained by the server portion 101, as well as by other server portions which may be provided by server computer(s) 12, and the various projects on which he or she is authorized to work, since an operator may be make use of several identifiers for him- or herself In particular, if, for example, an operator logs on to one client computer 11(*n*) using one identifier, and to another computer 11(*n'*) using another identifier, the registry 113 may contain identification information which indicates that both identifiers are for the same operator and allow him or her to, in turn, log onto and make use of projects to which he or she is authorized to have access from either computer and using either identifier. When the operator logs on, the projects he or she is authorized to work on, as determined by information in the registry are provided by the collaboration facilitation system server 111 to the client portion 102 he or she is operating, in a session identifier, which the client portion 102 may then use when attempting to access respective A single registry 113 may be shared among a plurality of server portions 101 to provide identification information therefor. Operations in connection with the collaboration facilitation system 100 will be described in detail below. Generally, when an operator wishes to establish project 20, he or she will enable the collaboration facilitation system client 103 of his client computer 11(*n*) to issue a request therefor to the collaboration facilitation system server 111 of the server portion 101 on which the project 20 is to be maintained. In that operation, the operator can identify the particular operators who are to be authorized to access and work on the project 20, and also provide security information for the project.

In one embodiment, one of two levels of security can be associated with a project, namely, "unrestricted" and "team only." If the security level of a project is "unrestricted," anyone (for example, anyone employed by an enterprise which maintains the network 10, the collaboration facilitation system, or the like) can access the project 20, whereas, if the security level of a project is "team only," only persons who are authorized on the project 20 can access the project 20. As will be described below, in the same embodiment, each notecard 30(*c*) can also be associated with one of two security levels, namely, "unrestricted" and a "custom" security level, which can be initially assigned by, for example, the operator who creates the notecard 30(*c*). Using the "custom" security level, the ability of operators to access and update a notecard 30(*c*) can be limited in a manner determined by the operator who has the ability to control the security level of the notecard 30(*c*). For example, using the "custom" security level, access and update rights can be limited to some subset of the "unlimited" population other than the project "team," that is, the set of operators who are authorized to work on the project. The security level of the notecards 30(*c*) that are associated with a project 20, in conjunction with the security level associated with the project 20, controls who can access and update the notecards 30(*c*). That is:

(i) if both the project 20 and a notecard 30(*c*) associated with the project 20 have the "unrestricted" security level, then anyone can access and modify the notecard 30(*c*) by accessing it (that is, notecard 30(*c*)) through the project 20;

(ii) if the project 20 has the "team only" security level and the notecard 30(*c*) associated with the project has the "unrestricted" security level, then only operators authorized on the project (that is, members of the "team") can access and modify the notecard 30(*c*) by accessing it (that is, notecard 30(*c*)) through the project 20;

(iii) if the project 20 has the "unrestricted" security level and the notecard 30(*c*) associated with the project has the "custom" security level, then only operators who are specified by the "custom" security level can access and modify the notecard 30(*c*) by accessing it (that is, notecard 30(*c*)) through the project 20; and (iv) if the project 20 has the "team only" security level and the notecard 30(*c*) associated with the project has the "custom" security level, then:

(a) if the "custom" security level identifies one or more operators in addition to those specified by the "team only" security level, then those operators who are not specified by the "team only" security level will not be permitted access and modify the notecard 30(*c*) by accessing it (that is, notecard 30(*c*)) through the project 20, and (b) if the "custom" security level does not identify one or more operators who are specified by the "team only" security level, then those operators who are not specified by the "custom" security level will not be permitted to access and modify the notecard 30(*c*) by accessing it (that is, notecard 30(*c*)) through the project 20, but otherwise operators specified by the "team only" security level will be permitted to access and modify the notecard 30(*c*) through the project 20.

It will be appreciated that, if two projects 20 and 20' have documents with placeholders which point to the same notecard 30(c) can have different security levels, and so an operator who is not authorized to access or update the notecard 30(c) through one project 20 may be authorized to do so through the other project 20'.

After the operator has enabled the collaboration facilitation system client 103 of his client computer 11(n) to, in turn, enable the collaboration facilitation system server 111 to establish the project 20, he or she can also enable the collaboration facilitation system client 103 to, in turn, enable the collaboration facilitation system server 111 to establish one or more documents 21(n) to be associated with the project 20. In addition, the operator can modify or update the document(s) so created to add placeholders 22(n)($m_n$) and link them together in the tree structure described above. In that operation, the operator will, using the collaboration facilitation system client 103, initiate a check-out procedure, described below in detail, with the collaboration facilitation system server 111, to obtain the document 21(n) to be modified and the right to modify the document. In response, if the operator is successful in the check-out procedure, the collaboration facilitation system server 111 can transfer information representing the document, which will be described below in connection with FIG. 4, to the collaboration facilitation system client 103, which, in turn, displays the document 21(n) in a whiteboard on the video display 106 of his or her client computer 11(n). Thereafter, the operator can add placeholders 21(n)($m_n$) to the document and link them together as described above in connection with FIG. 2. In addition, the operator can link notecards 30(c) to the respective placeholders 21(n)($m_n$), and in the process may also create notecards 30(c) or update existing notecards 30(c), provided he or she is authorized to have access to the respective notecards to be updated. For placeholders 21(n)($m_n$) to be associated with respective tasks, such as those for which notecards 30(c) are to be created and/or updated in the future, the operator can also provide information therefor in the respective placeholder 21(n)($m_n$). After the operator has finished modifying the document, he or she can, using a check-in procedure, enable the modified document to be transferred by the collaboration facilitation system client 103 to the collaboration facilitation system server 111 for storage in the data store 112, with the project and document information being stored in the project/document store portion 114 and notecard information being stored in the notecard store portion 115. The operator can perform similar operations in connection with other documents that may be created contemporaneously.

After the operator has established the project, one or more other operators who are also authorized to work on the project may perform similar operations as described above to access and possibly create and update documents 21(n) for the project 20. In those operations, if an operator wishes to merely enable a document 21(n) to be displayed on the video display 106, he or she need not go through the check-out procedure in connection with the document, and a subsequent check-in procedure. However, if the operator wishes to update the document, he or she will go through the check-out procedure, and, after the update is finished, the check-in procedure. If an operator is not authorized to operate on the project, if the security level for the project is "unrestricted," he or she may also access the project and documents created therefor to enable them to be displayed.

It will be appreciated that the collaboration facilitation system 100 facilitates collaboration by a number of operators in developing documents 21(n) for a project. After one operator has created the project 20, any of the operators who are authorized to work on the project can create and update documents 21(n) and placeholders 22(n)($m_n$) therefor, and link notecards 30(c) to the respective placeholders 22(n)($m_n$) to provide content therefor, in the process creating notecards 30(c) as necessary. The check-out and check-in procedures helps to synchronize the right to update respective documents 21(n) as among the various operators who are permitted to update the documents 21(n) associated with the project 20. The collaboration facilitation system 100 allows the operators to create and update documents 21(n) associated with project 20 at different times and, with the check-out and check-in procedures, the same document 21(n) at different times.

Details of operations performed by the collaboration facilitation system 100 will be described in detail below. Before proceeding further, however, it would be helpful to describe information structures associated with project 20 and a notecard 30(c)($v_c$) that is maintained by the collaboration facilitation system 100. Information associated with each project 20, including the documents 21(n) associated with the respective project 20 comprise data structures depicted in FIG. 4, and the information comprising notecard 30(c) is stored in data structures depicted in FIG. 5.

Figure 4:
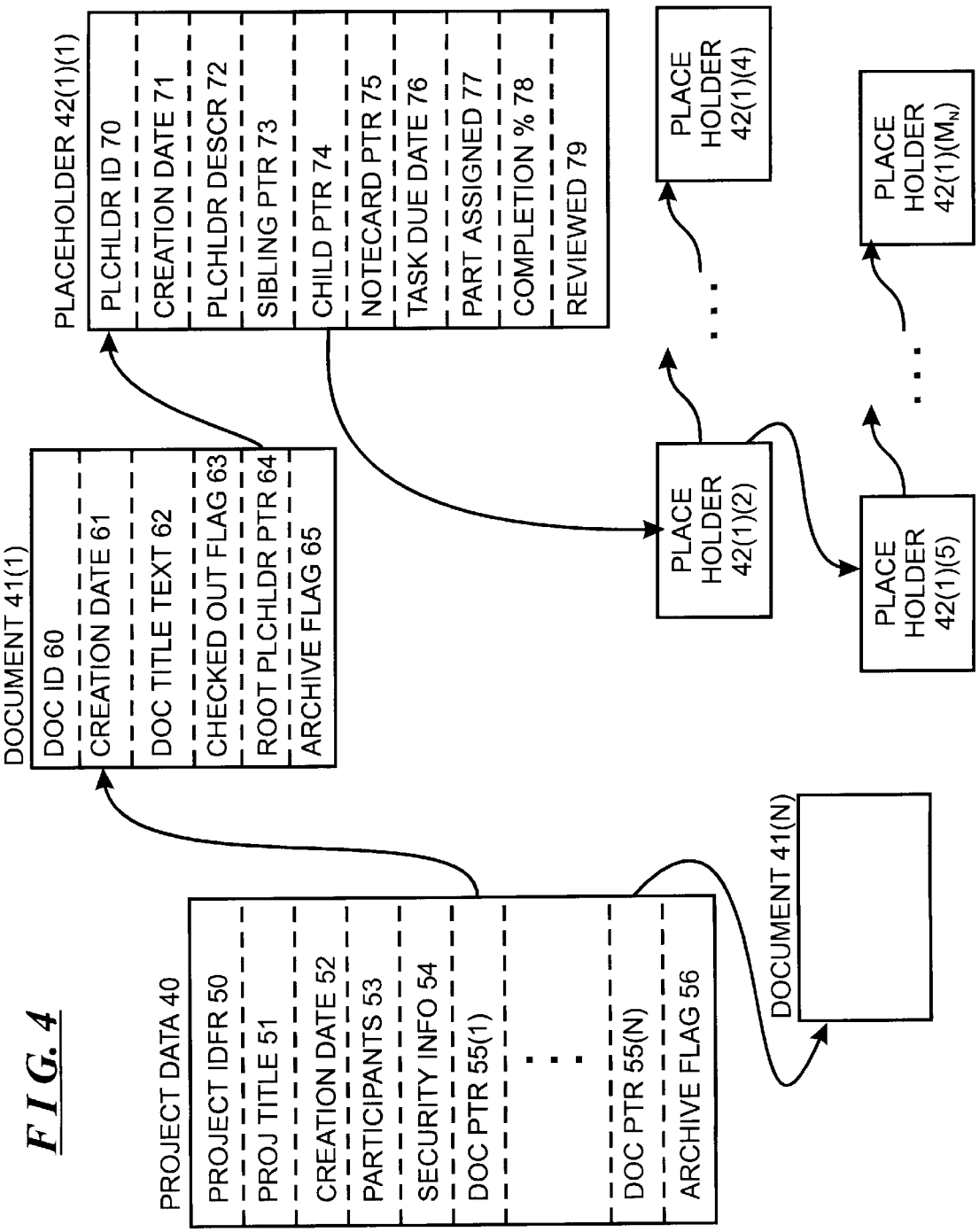
FIGS. 4 and 5 depicts data structures of project components depicted on FIG. 2, useful in understanding the operation of the collaboration facilitation system depicted in FIG. 3.

With reference initially to FIG. 4, the project includes a project data header 40, a document data header 41(n) for each document 21(n) which has been created, and a placeholder data header 42(n)($m_n$) for each placeholder 22(n)($m_n$) which has been created. The project date header 40 includes a number of fields, including a project identifier field 50, a project title field 51, creation date field 52, a participants field 53, a security information field 54, one or more document pointer fields 55(1) through 55(N) (generally identified by reference numeral 55(n), and an archive flag 56. The project identifier field 50 contains a unique identifier for the project 20 as among other projects that the collaboration facilitation system may maintain on, for example, the network 10. The project title field 51, on the other hand, contains a project name that the operator who creates or establishes the project 20 may give to the project, which may be displayed in a list of projects that the collaboration facilitation system may enable to be displayed to an operator when he or she logs on; preferably, when the operator logs on, the collaboration facilitation system will display the titles of only the projects of which that operator is a participant. The creation date field 52 contains the date on which the project 20 was established. The participants field 52 contains a list of the operators who are participants on the project 20, that is, who are authorized to create and update documents 21(n) on the project and further who are authorized to create and update notecards which are associated with the placeholders 22(n)($m_n$) in those documents 21(n). The security information field 54 contains security information for the project 20, as described above. Each of the document pointer fields 55(n) points to a document data header 41(n) for a respective one of the documents 21(n) which has been established for the project 20; thus, for example, document pointer field 55(1) points to the document data header 41(1) for document 21(1), document pointer field 55(2) (not shown) points to the document data header 41(2) for document 21(2), and so forth. Finally, the it archive flag 56 can be set by an operator to indicate that the project associated with project data header 40 is in an "archive" condition; if the archive flag 56 is set, the project associated with the project data header 40 will be in an "archive" condition, and otherwise the project will be in an "active" condition.

The document data headers 41(n) for the various documents 21(n) are all similar, and only one, namely document data header 41(1) in detail is shown in FIG. 4. As shown in FIG. 4, the document data header 41(1) includes a number of fields, including a document identifier field 60, a creation date field a document title text field 62, a checked out flag 63, a root placeholder pointer 64 and an archive flag 65. The document identifier field 60 contains a unique identifier for the document 21(1) associated with the document data header 41(1), as among other documents 21(n) (n≠1) that have been established for the project 20. The creation date field 61 contains the date on which the document 21(1) was created. The document title text field 62 contains a document name that the operator who creates or establishes the document 21(n) may give to the document, which may be displayed on a list of documents the collaboration facilitation system enables to be displayed when the operator logs onto the project 20. The root placeholder pointer 64 contains a pointer to the placeholder data header 42(1)(1) that is associated with the placeholder 21(1)(1) which forms the root of the tree of placeholders 21(1)($m_n$) comprising the document 21(1).

The checked out flag 63 of the document data header 41(1) is used to synchronize access to the document 21(1) associated with the document data header 41(1). As noted above, when an operator wishes to update the document 21(1), by, for example, adding a placeholder 22(n)($m_n$) to the document 21(1) and linking it to another placeholder, changing the structure of the document by changing the placeholder to which another placeholder is connected, changing the title of the document or a placeholder, and the like, he or she will "check out" the document and request that the checked out flag 63 to be set. The collaboration facilitation system server 111, in response to the request, determines whether the checked out flag 63 is already set, indicating that another operator has already checked out the document 21(1). If so, the collaboration facilitation system server 111 will provide a response to the collaboration facilitation system client 103 to so notify the operator, and will not allow him or her to update the document 21(1). On the other hand, if the collaboration facilitation system server 111 determines that the checked out flag 63 is not set when it receives a request from the operator, it will set the checked out flag 63, so notify the collaboration facilitation system client 103, and allow the operator to update the document 21(1) as described above. In addition, after the operator is finished updating the document 21(1), he or she can request that the document be "checked in," in which case the collaboration facilitation system server 111 will store the updated document information in the data store 112 and reset the checked out flag 63. After the document has been checked in, collaboration facilitation system server 111 does not allow the operator to further update the document 21(1) unless the operator again requests to check it (that is, the document 21(1)) out and is successful in checking it out as described above.

Finally, the archive flag 65 can be set by an operator to indicate that the document associated with document data header 41(1) is in an "archive" condition. If the archive flag 65 is set, the document associated with the document data header 41(1) will be in an "archive" condition, and otherwise the document will be in an "active" condition.

The placeholder data headers 42(n)($m_n$) associated with each of the placeholders 22(n)($m_n$) are also generally similar, and only one, namely, placeholder data header 42(1)(1) is shown in detail in FIG. 4. As shown in FIG. 4, the placeholder data header 42(1)(1) includes a number of fields, including a placeholder identifier field 70, a creation date field 71, a placeholder description field 72, a sibling pointer field 73, a child pointer field 74, a notecard pointer field 75, a task due date field 76, a participant assigned field 77, a completion percentage field 78, and a reviewed field 79. The placeholder identifier field 70 contains a unique identifier for the placeholder 22(1)(1) associated with the placeholder data header 42(1)(1), as among other placeholders 22(1)($m_n$)($m_n$≠1) that have been established for the document 21(1). The creation date field 71 contains the date on which the placeholder 22(1)(1) was created. The placeholder description text field 72 contains a placeholder name that the operator who creates or establishes the placeholder 22(1)($m_n$) may give to the placeholder which may be displayed on the placeholder when the collaboration facilitation system enables the document 21(1) containing the placeholder to be displayed when the operator selects the document 21(1). The notecard pointer field 75 contains a pointer to the notecard that is associated with the placeholder 21(1)(1).

The sibling pointer field 73 and child pointer field 74 of the various placeholder data headers 42(1)($m_n$) are used to link the placeholder data headers into a tree structure, which conforms to the tree structure depicted in FIG. 2. Placeholders 22(n)($m_n$) which are connected to the same parent placeholder in the tree-structure defining the document 21(n) are referenced here as "siblings." The sibling pointer field 73 of each placeholder data header 42(1)($m_n$) can contain a sibling pointer that, as among placeholders 42(1)($m_n$) connected to the same parent, points to the next placeholder 42(1)($m_n$). Since the placeholder 22(1)(1) which forms the root node in the tree structure of the document 21(1) does not have a sibling, the sibling pointer field 73 of the placeholder data header 42(1)(1) will not contain a sibling pointer. However, the sibling pointer fields 73 of placeholder data headers 42(1)($m_n$) of at least some of the other placeholders 22(1)($m_n$) in the document 21(1) will generally include sibling pointers. The sibling pointers in a series of placeholder data headers 42(n)($m_n$) essentially links the placeholder data headers in a linked list in the order in which the collaboration facilitation system will enable the associated placeholders 22(n)($m_n$) to be displayed on a computer's video display terminal. Thus, for example, the sibling pointer in sibling pointer field 73 of the placeholder data structure 42(1)(2) associated with placeholder 22(1)(2) will point to placeholder data structure 42(1)(3), and so forth for the placeholder data structures associated with the successive sibling placeholders 22(1)(2) through 22(1)(4) which are siblings and children of the root placeholder 22(1)(1). The sibling pointer in field 73 of the placeholder data header 42(1)(4) that is associated with the last of the sibling placeholders 22(1)(4) can contain, for example, a null value to indicate that it is the last of the sibling placeholder data headers in the linked list. As noted above, the placeholder data header 42(1)(1) associated with the root placeholder 22(1)(1) does not contain a sibling pointer in its field 73, or, alternatively, it can contain the null value used in connection with the last placeholder data header 42(n)($m_n$) among a series of siblings. Similarly, if, at any level other than the root level, a placeholder data header 42(n)($m_n$) is associated with a placeholder that does not have any siblings, its sibling pointer field 73 may also contain a null value, indicating that it is associated with the last, as well as the first, placeholder 22(n)($m_n$) as child of its parent placeholder.

The child pointer field 74 can contain a child pointer is used to link a placeholder data header 42(n)($m_n$) associated with a placeholder 22(n)($m_n$) to a placeholder data header 42(n)($m_n$) associated with a child placeholder. Essentially, the child pointers in child pointer fields in respective placeholder data headers $42(n)(m_n)$ define the links between each placeholders $22(n)(m_n)$ at different levels in the tree. Since, as noted above, the sibling pointers in sibling pointer fields 73 comprising the children of a placeholder data header $22(n)(m_n)$ define a linked list, the child pointer in the child pointer field 74 of a placeholder $22(n)(m_n)$ need only point to the placeholder data header associated with the first placeholder in the linked list. As with the sibling pointers, if a placeholder $22(n)(m_n)$ does not have any children, it can include a null value to so indicate.

As noted above, a placeholder $22(n)(m_n)$ can also represent a task to be performed in connection with generation of the document, which may include, for example, the task of generating a notecard $30(c)$ that is to be associated with the placeholder $22(n)(m_n)$ at the particular location in the document. In that connection, the last four fields, namely, the task due date field 76, the participant assigned field 77, the completion percentage field 78 and the reviewed field 79, of the placeholder data header 42(1)(1), along with the placeholder description field 72, may be used to identify or briefly describe the task that is to be performed in connection with the placeholder 22(1)(1) associated with header 42(1)(1). In particular, an operator can enable information to be stored in the placeholder description field 72 which describes a task to be performed in connection with the placeholder 22(1)(1), which may include, for example, a description of the content that is to be associated therewith in a notecard $30(c)$. The task due date field 76 can contain a due date by which the task is completed, and the participant assigned field 77 can contain identification of an operator who is assigned to perform or oversee the task. The completion percentage field 78 can contain a task completion percentage that the operator who is assigned to perform or oversee the task can periodically update. The reviewed field 79 can contain an indication by the operator who, for example, originated the task, that the results of the task, which may be, for example, a new or updated notecard $30(c)$, has been positively reviewed, suggestions for revisions, or the like.

Figure 5:
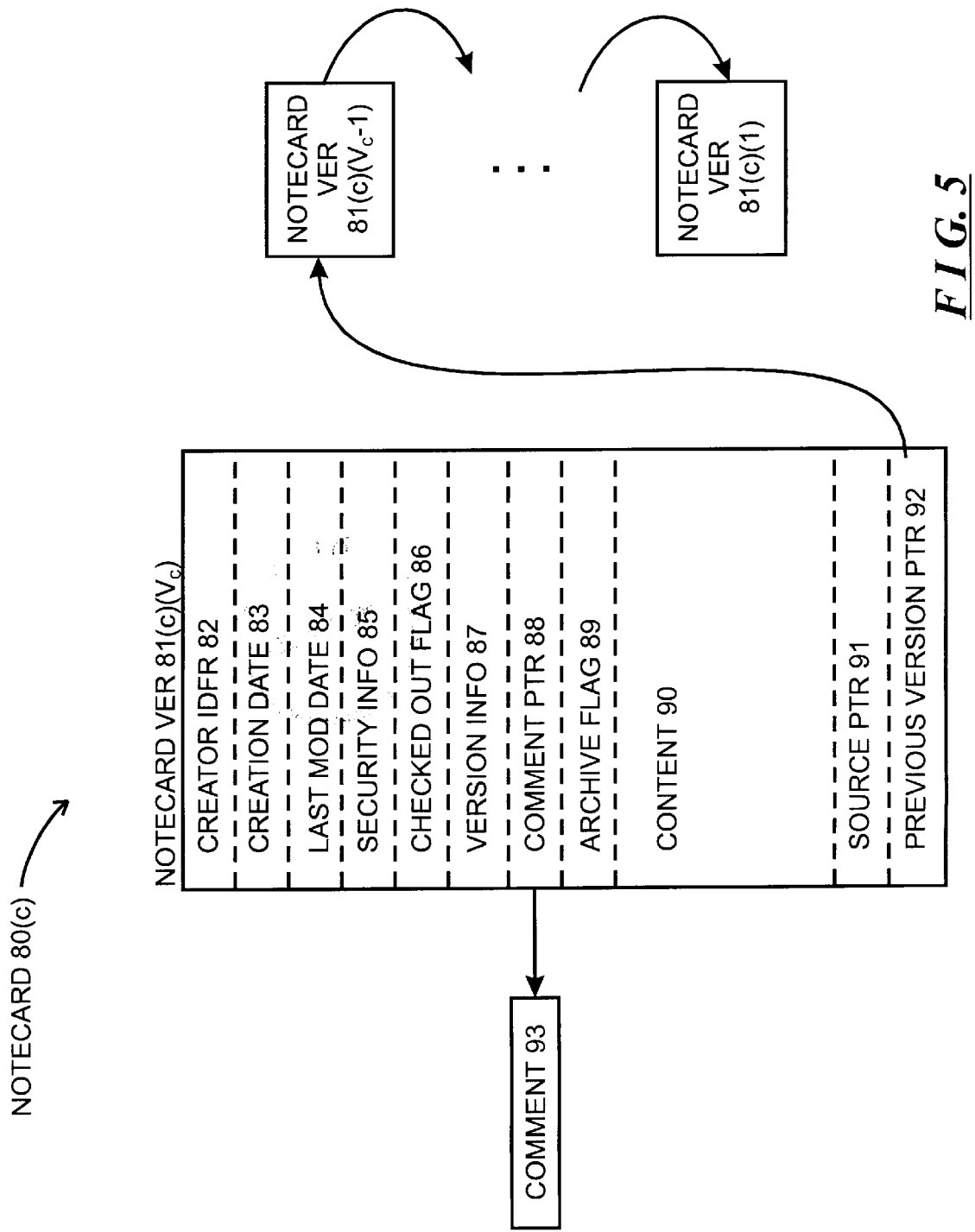

Each notecard $30(c)(v_c)$ has an associated data structure, which will be described in connection with FIG. 5. With reference to FIG. 5, as noted above, the collaboration facilitation system 100 maintains, for each notecard $30(c)$ $(v_c)$, the various versions of the notecard, and the data structure provided for each notecard, hereinafter identified as notecard data structure $80(c)$, can include a linked list of notecard version data structures $81(c)(1)$ through $81(c)(v_c)$, each associated with a respective notecard version $30(c)(1)$ through $30(V_c)$ (FIG. 2). It will be appreciated that, if a notecard $30(c)$ includes only one version, only one notecard version data structure $81(c)(1)$ need be provided therefor.

The notecard version data structures are generally similar, and only one notecard version data structure, in particular, the notecard version data structure $81(c)(V_c)$ associated with the last notecard version $30(c)(V_c)$ of notecard $30(c)$, will be described in detail. As shown in FIG. 5, the notecard version data structure $81(c)(V_c)$ includes a plurality of fields, including a creator identifier field 82, a creation date field 83, a last modified date field 84, a security information field 85, a checked out field 86, a version information field 87, a comment pointer field 88, an archive flag 89, a content field 90, a source pointer field 91 and a previous version pointer 92. The creator identifier field 82 receives a value that identifies the person who initially created the notecard $30(c)$ with which the notecard version $30(c)(V_c)$ represented by notecard version data structure $81(c)(V_c)$ is associated. The creation date field 83 receives a value that identifies the date on which the notecard $30(c)$ was created. The security information field 85 contains security information for the notecard $30(c)$, as described above.

The last modified date field 84 of the notecard version data structure $81(c)(V_c)$ receives a value that identifies the date on which the notecard was last modified, which corresponds to the date on which the last notecard version $30(c)(V_c)$ was established. The checked out flag 86 serves a purpose similar to that served by the checked out flag 63 in the document data header $41(n)$ described above. In particular, the checked out flag 86 is used to synchronize access to the notecard $30(c)$ associated with the notecard data structure $80(c)$ as among operators who are authorized to update the notecard $30(c)$. When an operator wishes to update the notecard $30(c)$, by, for example, adding and/or modifying the content associated with the notecard $30(c)$ and the like, he or she will "check out" the notecard 30 and request that the checked out flag 86 to be set. The collaboration facilitation system server 111, in response to the request, determines whether the checked out flag 86 is already set, indicating that another operator has already checked out the notecard $30(c)$. If so, the collaboration facilitation system server 111 will, through the collaboration facilitation system client 103, so notify the operator and not allow him or her to update the notecard $30(c)$. On the other hand, if the collaboration facilitation system server 111 determines that the checked out flag 86 is not set when it receives a request from the operator, it will set the checked out flag 86 and, through the collaboration facilitation system client 103, allow the operator to update the notecard $30(c)$ as described above. In addition, after the operator is finished updating the notecard $30(c)$, he or she can request that the document be "checked in," in which case the collaboration facilitation system server 111 will store the updated notecard $30(c)$ in the data store 112 and reset the checked out flag 86. After the document has been checked in, collaboration facilitation system server 111 does not allow the operator to further update the notecard $30(c)$ unless the operator again requests to check it (that is, the notecard $30(c)$) out and is successful in checking it out as described above.

The version information field 87 contains information as to the number of times the notecard $30(c)$ associated with the notecard data structure $80(c)$ has been updated (corresponding to the number of versions after the original version $30(c)(1)$), and perhaps other information, such as the dates on which each of the updates occurred.

The comment pointer field 88 can contain a value comprising a comments pointer that points to one or more comments 93 which an operator has associated with notecard $81(c)(V_c)$. If multiple comments are associated with the notecard, they can be in the form of a linked list, and in that case the comments pointer field 88 can point to the first comment in the linked list. If there are no comments associated with the notecard, the comments pointer field 88 can contain a null value to so indicate. In one embodiment, a comment will expire a predetermined time period after it has been added, and after that time period the collaboration facilitation system server 111 can delete the comment.

The archive flag 89 can be set by an operator to indicate that the notecard $30(c)(V_c)$ associated with notecard data structure $81(c)(V_c)$ is in an "archive" condition. If the archive flag 89 is set, the notecard associated with the notecard data structure $81(c)(V_c)$ will be in an "archive" condition, and otherwise the notecard will be in an "active" condition.

The content field 90 of the notecard version data structure $81(c)(V_c)$ contains the actual content of the corresponding notecard version $30(c)(V_c)$, including, for example, the textual, graphical, image, video, audio, or other information that is associated with the notecard version $30(c)(V_c)$. In one embodiment, the textual information is preferably in HTML (HyperText Markup Language) form. Graphical or image information may be in any conventional format, including, for example, GIF, JPEG, or the like. Similarly, the video and/or audio information may be in any conventional format, including, for example, MPEG, or the like. The source pointer field 91 can include a pointer to base or source information for the information in the content field 90, including, for example, URL'S to Web pages available over the Internet for information which was used in generating the content information in the content field 90 or which provides background information therefor, pointers identifying such information, and the like. When an operator updates a notecard $30(c)$ creating a new version $30(c)(v_c)$ he or she can provide source information in the source pointer field 91 to the source for the update.

The previous version pointer field 92 contains a previous version pointer that, if there are multiple notecard versions associated with a notecard $30(c)$ (that is, if notecard version data structure $81(c)(V_c)$ is not notecard version data structure $30(c)(1)$), is used to link the notecard version data structures $30(c)(v_c)$ into a linked list. Thus, the previous version pointer of the notecard version data structure $81(c)$ $(V_c)$, associated with the notecard version $30(c)(V_c)$, points to the notecard version data structure $81(c)(V_c-1)$ associated with the notecard version $30(c)(V_c-1)$. Generally, the previous version pointer in field 92 of each notecard version data structure $81(c)(v_c)(v_c \neq 1)$ associated with the notecard version $30(c)(v_c)$ points to the notecard version data structure $81(c)(V_c-1)$ associated with the previous notecard version $30(c)(v_c-1)$. In the case of the first notecard version $30(c)(1)$ the C6 previous version pointer field 92 may contain a null or other value indicating that there is no previous notecard version data structure.

It will be appreciated that a number of fields described as forming the notecard version data structure $81(c)(V_c)$, including, for example, the creator identifier field 82, creation date field 83, last modified date field 84, security information field 85, checked out flag 86, version information field 87, comment pointer field 88 and archive flag 89, can be common to all of the notecard version data structures $81(c)(v_c)$ associated with the notecard $30(c)$. In that case, one set of such fields 82 through 87 can be provided for the notecard data structure $80(c)$, in which case the notecard version data structures $81(c)(v_c)$ $(v_c \neq V_c)$ other than the notecard version data structure associated with the last notecard version $30(c)(V_c)$ will not include such fields; thus, each of the notecard version data structures $81(c)(V_c-1)$ through $81(c)(1)$ would not include fields 82 through 87. Alternatively, fields 82 through 87 described above as being part of notecard version data structure $81(c)(V_c)$ may be in the form of a header common to all of the notecard version data structures $81(c)(v_c)$, and each of the notecard version data structures $81(c)(v_c)$ would instead consist only of the content field 90, the source pointer field 91 and the previous version pointer field 92. As a further alternative, all of the source information maybe in a single source pointer field 92 provided for all of the notecard version data structures $81(c)(v_c)$ in which case, that field 92 may also form part of the header common to all of the notecard version data structures. With this background, the detailed operations performed by the collaboration facilitation system 100 will be described with reference to FIGS. 2 through 5. If an operator wishes to create a new project 20, he or she can, using his or her client computer $11(n)$, and specifically the client portion 102 of the collaboration facilitation system 100, transmit a request therefor to the collaboration facilitation system server 111. The request can include a title, a list of operators authorized to work on the project and a security level. In response to the request, the collaboration facilitation system server 111 will generate a project data header 40 for the project, load the title, operator list and security level as values in fields 51, 53 and 54 of the project data header, clear the archive flag 56 so that the project will be in a not-archived state, and store the project data header 40 in the project/document store 114 of data store 112. The collaboration facilitation system server 111 will also load a project identifier value in field 50 and a value identifying the date on which the project was created in creation date field 52. Thereafter, if the collaboration facilitation system 111 was successful in creating and storing the project data header 40 for the project 20 in response to the request, it can transmit a response to the collaboration facilitation system client 103 so indicating, after which the operator, or other operators authorized to work on the project, can create documents $21(n)$ and placeholders $22(n)(m_n)$ therefor and associate notecards $30(c)$ therewith, creating the notecards $30(c)$ as necessary.

On the other hand, if the collaboration facilitation system 111 was not successful in creating or storing the project data header 40 for the project in response to the request, it can transmit an appropriate response to the collaboration facilitation system client 103 so indicating. In response to such a response, the operator can take appropriate actions, including, for example repeating the original request.

After the project 20 has been created, the operator and/or other operators authorized to work on the project 20 can enable one or more documents $21(n)$ to be added to the project 20. To add a document $21(n)$ to the project, the operator who wishes to enable the document to be added will, in turn, enable the collaboration facilitation system client 103 of the client computer $11(n)$ he or she is operating, to generate an appropriate request therefor, which may include title text for the document $21(n)$, for transfer to the collaboration facilitation system server 111. After the collaboration facilitation system server 111 receives the document creation request, it will initially determine from the participants field 53 of the project data header 40 whether the operator who enabled the request to be generated is authorized to work on the project. If not, the collaboration facilitation system server 111 can return an appropriate response to the collaboration facilitation system client 103 to enable the operator to be so notified.

On the other hand, if the collaboration facilitation system server 111 determines that the operator who enabled the request to be generated is authorized to work on the project, it can create the document data header $41(n)$ for the document $21(n)$ to be created, it will load the title text into field 62, provide document identifier and creation date values for fields 60 and 61, clear the archive flag 65 so that the document will be in a not-archived state, and store the document data header 41(1) in the project/document store portion 114 of the data store 112. In addition, the collaboration facilitation system server 111 can store a pointer to the document data header $41(n)$ in the appropriate document pointer field $55(n)$ of the project data header 40. Thereafter, if the collaboration facilitation system 111 was successful in creating and storing the document data header $41(n)$ for the document $21(n)$ in response to the request, it can transmit a response to the collaboration facilitation system client 103 so indicating, after which the operator, or other operators authorized to work on the project, placeholders $22(n)(m_n)$ therefor and associate notecards 30(c) therewith, creating the notecards 30(c) as necessary.

After a document has been created, the operator who created it, as well as other operators who are authorized to work on the project, can modify the structure of the document, by changing the linkage as among existing placeholders 22(n)($m_n$), if any, or enabling placeholders 22(n)($m_n$) to be generated therefor and linked to the document. In that operation, the operator will enable the collaboration facilitation system client 103 of the client computer 11(n) he or she is operating, generate a check-out request for the document 21(n) to which the placeholder is to be added, for transfer to the collaboration facilitation system server 111. In response to the check-out request, the collaboration facilitation system server 111 will initially determine from the participants field 53 of the project data header 40 whether the operator who enabled the request to be generated is authorized to work on the project. If not, the collaboration facilitation system server 111 can return an appropriate response to the collaboration facilitation system client 103 to enable the operator to be so notified.

On the other hand, if the collaboration facilitation system server 111 determines that the operator who enabled the request to be generated is authorized to work on the project, it will determine the condition of the checked out flag 63. If it determines that the checked out flag 63 is set, indicating that another operator has already checked out the document 21(n), it will so notify the operator by generating an appropriate response for transfer to the collaboration facilitation system client 103 of his or her computer 11(n).

On the other hand, if the collaboration facilitation system server 111 determines, after receiving a check-out request, that the checked out flag 63 is not set, indicating that no other operator the document 21(n) checked out, it can set the checked out flag 63 and generate an appropriate response for transfer to the collaboration facilitation system 103, including information as to the current structure of placeholders, if any, in the document. Thereafter, the collaboration facilitation system client 103 can enable the video display 106 to display the whiteboard and, if the document 21(n) has any placeholders associated therewith and their current organization. Thereafter, the operator can modify the placeholder structure of the document. In that operation, if placeholders are to be added, the operator can provide a placeholder title and specify the parent placeholder (if any) to which the new placeholder is to be linked. In addition, the operator can associate notecards 30(c) with respective placeholders, and, in that process, generate new notecards 30(c) as necessary.

When the operator is finished modifying the document 21(n), or periodically during that operation, he or she can enable the collaboration facilitation system client to, in turn, transfer document modification information to the collaboration facilitation system server 111 which, in turn, can update the data structures associated with the document 21(n). In those operations, if a placeholder 22(n)($m_n$) has been added, the collaboration facilitation system server 111 can generate a new placeholder data header 42(n)($m_n$) therefor, load the description text into field 72, provide placeholder identifier and creation date values for fields 70 and 71, and store the placeholder data it header 42(n)($m_n$) in the project/document store portion 114 of the data store 112. If the placeholder is associated with a task, it (that is, the collaboration facilitation system server 111) can also load task due date, participant assigned, completion percentage and/or reviewed values as appropriate, as provided by the operator, in the fields 76 through 79 of the placeholder data header 42(n)($m_n$). In addition, the collaboration facilitation system server 111 will update linkage information in root placeholder pointer field 64 of the document data header 41(n) and sibling and child pointer fields 73 and 74 of respective placeholder data headers 42(n)($m_n$) as appropriate. Further, if a notecard was linked to the placeholder 22(n)($m_n$), the collaboration facilitation system server 111 can add the appropriate pointer thereto in field 75.

After the operator has finished modifying the document, he or she can enable the collaboration facilitation system client 103 to initiate the check in procedure to send the final modifications to the collaboration facilitation system server 11 and check the document 21(n) in. In that operation, after the collaboration facilitation system client 103 has transferred the final modifications to the collaboration facilitation system server 111, the server 111 can perform operations similar to those described above to process and store the modifications in the project/data store 114. After that has been accomplished, during the check-in procedure, the collaboration facilitation system server 111 will reset the checked out flag 63 of the document 21(n). Thereafter, other operators can check out the document 21(n) to modify it as described above.

As noted above, others than those who are authorized to work on a project (that is, operators other than those identified on the participants list in field 53 of the project's project data header 40) may retrieve information from the server portion 101 for review, depending on the security level in security information field 54 (FIG. 4) of the project data header 40, and, if the information is from a notecard 30(c), security information field 85 (FIG. 5) of the notecard 30(c). In that operation, the operator can enable the collaboration facilitation system client 103 of his computer 11(n) to generate a request therefor for transfer to the collaboration facilitation system server 111. If the collaboration facilitation system server determines that the security level(s) allow the operator to review the contents of the project, it can transfer the requested information to the collaboration facilitation system client 103 for display on a whiteboard on the video display 106. On the other hand, if the collaboration facilitation system server 111 determines that the security level(s) allow the operator to review the contents of the project, it can provide an appropriate response to the collaboration facilitation system client 103.

As noted above, the project data header 40, document data header 41(n) and notecard data structure 81(c)($V_c$) all have respective archive flags 56, 65, and 89, which, if set, indicate that the respective project 20, document 21(n) and notecard 30(c) are in an archive state. If a project 20, document 21(n) or notecard 30(c) is in the archive state, the collaboration facilitation subsystem server 111 will, in response to a request therefor from a client 103, so indicate, in which case information therefor will generally not be provided thereto.

The collaboration facilitation system 100 in one embodiment also provides a number of other features. For example, an operator can, from an existing document 21(n), enable the collaboration facilitation system 100 to create a document template (not shown) which has a similar document structure but to which no notecards 30(c) are associated. In particular, if a document template is to be based on a document 21(n), the template will be associated with a data structure comprising the document data header 41(n) and placeholder data headers 42(n)($m_n$) associated with the document 21(n) on which the template is to be based. In that case, the document identifier field 60 of the document data header for the template can receive a template identifier field, creation date field 61 can receive a value identifying the date on which the template was created, the document title text field 63 can receive template identifier text, the checked out flag 63 can be reset. The root placeholder pointer field 64 will maintain the pointer to the root placeholder data header 42(n)(1) associated with the tree of placeholders to be associated with the document template. Similarly, for each placeholder data header 42(n)($m_n$) in the template, the placeholder identifier field 70 can receive a template placeholder identifier value, the creation date field 71 can receive a value identifying the date on which the template was created, the placeholder description field 72 can receive placeholder identifier text, and the notecard pointer field 75 can receive a null value indicating that there are no notecards 30(c) associated with the placeholder data header 42(n)($m_n$). The sibling pointer 73 and child pointer field 74 will maintain the pointers to the sibling and child placeholders, or null values if to indicate that no sibling or child placeholder is associated with the respective placeholder, as in the It document on which the placeholder 42(n)($m_n$) is based, thereby to maintain the tree structure as among the placeholder data headers in the template.

An operator may make use of a template in connection with a project 20 by enabling the collaboration facilitation system server 111 to instantiate a copy of the template as a document for the project, providing values for the fields 61–63 of the document data header 41(n) for the document, and fields 70–73 for the placeholder data header(s) 42(n) ($m_n$) for the respective placeholders. That operator, and/or other operators who are authorized, can also add notecards in a manner described above, in which case, the notecard pointer fields 75 may receive pointers as described above. In addition, the document so created can be modified in the same way as documents created as described above, that is, by the addition or deletion of placeholders 22(n)($m_m$) or modifying the links between existing placeholders 22(n) ($m_n$).

The collaboration facilitation system 100 also provides arrangements for searching for information from headers 40,41(n) and 42(n)($m_n$) associated with respective projects 20, documents 21(n), placeholders 22(n)($m_n$), as well as from notecard data structures 81(c)($v_c$) associated with respective notecards 30(c). In one embodiment, the collaboration facilitation system 100 also provides a keyword system in which an operator can assign keyword tags to projects, documents, and placeholders. Each keyword tag is in the form of a hierarchical category/property tuple, where the possible values for the categories and properties are predetermined and useful in connection with all projects maintained by the collaboration facilitation system 100. The keyword tags assigned to a project 20 are inherited by its documents 21(n), placeholders 21(n)($m_n$) and notecards 30(c) associated with those placeholders 21(n)($m_n$). That is, each keyword tag assigned to a project 20 will also be deemed to have also been assigned to each of its documents 21(n) and each of the placeholders 21(n)($m_n$) and associated notecards 30(c) that are associated with those documents 21(n). Similarly, each keyword tag assigned to a document 21(n) will also be deemed to have also been assigned to each of the placeholders 21(n)($m_n$) and associated notecards 30(c) that are associated with the document 21(n). Using specific keyword tags, an operator can request the collaboration facilitation system server 111 provide information relating to projects 20, documents 21(n), placeholders 22(n)($m_n$) and/or notecards 30(c) associated with particular categories and properties.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for facilitating collaboration among a plurality of users in connection with generation of a document, the system comprising:
   A. a document information store configured to store document information relating to at least one document, the document information including both document structure information and document content information,
      i. the document structure information describing document structural elements for said at least one document, document structural information for said at least one document comprises a plurality of placeholder nodes organized in a tree structure and said document content elements comprises notecards, each placeholder node being configured to have a pointer to one of said notecards,
      ii. the document content information comprising document content elements associated with respective document structural elements;
   B. a user module associated with said users, at least one user module comprising:
      i. a whiteboard display module configured to display a whiteboard to said user, the whiteboard selectively displaying document structure defined by the document structural elements for said at least one document and said document content information therefor;
      ii. a document update module configured to enable said user to selectively update the document structure and said document content information therefor as displayed by said whiteboard display module; and
      iii. an interface module configured to selectively enable the retrieval of document information for said at least one document and document content information as requested by said operator for display by said whiteboard display module and update of document information as stored in said document information store to be updated in response to updates received by said document update module.

2. A system as defined in claim 1 in which said document information store stores said document information relating to a plurality of documents.

3. A system as defined in claim 2 in which in which said document structure as defined by document structural information for each document comprises a plurality of placeholder nodes organized in a tree structure and said document content elements comprises notecards, each placeholder node being configured to have a pointer to one of said notecards.

4. A system as defined in claim 3 in which a plurality of placeholder nodes can have pointers pointing to one of said notecards.

5. A system as defined in claim 2 in which each document is associated with a project, each project being configured to be associated with a plurality of documents.

6. A system as defined in claim 5 in which said document information store is further configured to store project information relating to each said project, said project information including a pointer to document structure information relating to each document associated with said project.

7. A system as defined in claim 6 in which said project information associated with at least one project further includes a participants list configured to identify each user authorized to access content information associated with each document associated with each project.

8. A system as defined in claim 7 in which:
  A. said interface module, to enable retrieval of document information for a document associated with a project, is configured to generate a document retrieval request for transmission to said document information store, said document retrieval request including a user identifier, and
  B. said document information store is configured to use the user identifier and the participants list to determine whether to provide document information requested in said document retrieval request to the user module associated with the interface module which generated said retrieval request, and, in response to a positive determination, provide the document information to that user module.

9. A system as defined in claim 8 in which said project information associated with said at least one project further includes security information the document information store being further configured to use the security information to determine whether to provide document information requested in said retrieval request to the user module associated with the interface module which generated said retrieval request.

10. A system as defined in claim 7 in which:
  A. said interface module, to enable update of document information for a document associated with a project, is configured to generate a document update request for transmission to said document information store, said document update request including a user identifier, and
  B. said document information store is configured to use the user identifier and the participants list to determine whether to update the document information associated with the document identified in said document update request.

11. A system as defined in claim 6 in which said project information includes a document pointer list comprising a document pointer entry for each document associated with said project, each document pointer entry including a document pointer pointing to document information for said ii document in said document information store.

12. A system as defined in claim 6 in which said whiteboard display module is further configured to selectively display project information associated with said project.

13. A system as defined in claim 12 in which
  A. said whiteboard display module is further configured to enable said interface module to request project information related to said project from said document information store, and to display project information provided thereto by the interface module,
  B. the interface module is further configured to in response generate a project information retrieval request for transmission to said document information store, and provide project information received from said document information store to the whiteboard display module for display; and
  C. the document information store is further configured to, in response to a project information request relating to said project, provide at least some of the project information associated with said project to the user module associated with the interface module which generated the project information request.

14. A system as defined in claim 13 in which the at least some of the project information includes a document list identifying at least one document associated with said project.

15. A system as defined in claim 14 in which said whiteboard display module is further configured to receive document selection information from said user identifying a document identified on said document list, and in response thereto to enable the interface module to enable retrieval of document information associated with the identified document for display by said whiteboard display module.

16. A system as defined in claim 13 in which at least some of the project information includes a C project title, the whiteboard display module being configured to display said project title on said whiteboard.

17. A system as defined in claim 1 in which the whiteboard display module is configured to display the document by displaying the placeholder nodes in the tree structure.

18. A system as defined in claim 17 in which said at least one document is associated with a document title, the document information associated with said document including said document title.

19. A system as defined in claim 17 in which said document information associated with said at least one document includes a plurality of placeholder node headers associated with each placeholder node associated with the document.

20. A system as defined in claim 19 in which:
  A each placeholder node header is configured to include respective inter-placeholder node pointers pointing to another placeholder node in the tree structure thereby to organize placeholder nodes associated with the document in the tree structure; and
  B. said whiteboard display module is configured to use the inter-placeholder node pointers of the placeholder node headers to organize the placeholder nodes as displayed thereby in the tree structure.

21. A system as defined in claim 20 in which
  A. one of said placeholder nodes is a root placeholder node in the tree structure;
  B. said at least one document includes a document header configured to include a root placeholder node pointer pointing to the placeholder node header in the associated with the root placeholder node; and
  C. said document information store is configured to use the root placeholder node pointer from the document header associated with the document whose document information is to be retrieved to identify the placeholder node header associated with the root placeholder node for the document whose document information is to be retrieved, and to use the inter-placeholder node pointers in the respective placeholder node headers to identify placeholder node headers associated with the document during a retrieval thereof.

22. A system as defined in claim 19 in which said document content elements comprise notecards, and further in which each placeholder node header is configured to have a notecard pointer to one of said notecards.

23. A system as defined in claim 22 in which:
A. said whiteboard display module is configured to, in response to an retrieval request from said user relating to a placeholder node, enable the interface to transmit a document content element request for the placeholder node whose document content is to be retrieved; and
B. said document information store is configured to provide the notecard pointed to by the notecard pointer of the placeholder node whose document content element was requested in the document content element request for display by said whiteboard display module.

24. A system as defined in claim 23 in which the document content element request as transmitted by the interface includes a pointer to the placeholder node header of the placeholder node whose associated document content element is to be provided, and further in which the document information store is configure to use the placeholder node pointer to identify the placeholder node header and thereafter use the notecard pointer obtained therefrom to identify the notecard comprising the document content element.

25. A system as defined in claim 23 in which the document content element request as transmitted by the interface includes a pointer to the notecard to be provided, and further in which the document information store is configure to use the notecard pointer to identify the notecard comprising the document content element.

26. A system as defined in claim 1 in which document information associated with said at least one document includes a checked out flag having a plurality of conditions, the document information store selectively permitting a user to update said at least one document based on the condition of the checked out flag.

27. A system as defined in claim 1 in which in which document content information associated with said at least one document includes a checked out flag having a plurality of conditions, the document information store selectively permitting a user to update said document content information based on the condition of the checked out flag.

28. A user module for use in connection with a system for facilitating collaboration among a plurality of users in connection with generation of a document, the system comprising a document information store configured to store document information relating to at least one document, the document information including both document structure information and document content information,
  i. the document structure information describing document structural elements for said at least one document, document structural information for said at least one document comprises a plurality of placeholder nodes organized in a tree structure and said document content elements comprises notecards, each placeholder node being configured to have a pointer to one of said notecards,
  ii. the document content information comprising document content elements associated with respective document structural elements;
the user module being associated with one of said users, the user module comprising:
A. a whiteboard display module configured to display a whiteboard to said user, the whiteboard selectively displaying document structure defined by the document structural elements for said at least one document and said document content information therefor;
B. a document update module configured to enable said user to selectively update the document structure and said document content information therefor as displayed by said whiteboard display module; and
C. an interface module configured to selectively enable the retrieval of document information for said at least one document and document content information as requested by said operator for display by said whiteboard display module and update of document information as stored in said document information store to be updated in response to updates received by said document update module.

29. A user module as defined in claim 28 in which said document information store stores said document information relating to a plurality of documents.

30. A user module as defined in claim 29 in which in which said document structure as defined by document structural information for each document comprises a plurality of placeholder nodes organized in a tree structure and said document content elements comprises notecards, each placeholder node being configured to have a pointer to one of said notecards.

31. A user module as defined in claim 30 in which a plurality of placeholder nodes can have pointers pointing to one of said notecards.

32. A user module as defined in claim 29 in which each document is associated with a project, each project being configured to be associated with a plurality of documents.

33. A user module as defined in claim 32 in which said document information store is further configured to store project information relating to each said project, said project information including a pointer to document structure information relating to each document associated with said project.

34. A user module as defined in claim 33 in which said project information associated with at least one project further includes a participants list configured to identify each user authorized to access content information associated with each document associated with each project.

35. A user module as defined in claim 34 in which:
A. said interface module, to enable retrieval of document information for a document associated with a project, is configured to generate a document retrieval request for transmission to said document information store, said document retrieval request including a user identifier, and
B. said document information store is configured to use the user identifier and the participants list to determine whether to provide document information requested in said document retrieval request to the user module associated with the interface module which generated said retrieval request, and, in response to a positive determination, provide the document information to that user module.

36. A user module as defined in claim 35 in which said project information associated with said at least one project further includes security information the document information store being further configured to use the security information to determine whether to provide document information requested in said retrieval request to the user module associated with the interface module which generated said retrieval request.

37. A user module as defined in claim 34 in which:
A. said interface module, to enable update of document information for a document associated with a project, is configured to generate a document update request for transmission to said document information store, said document update request including a user identifier, and B. said document information store is configured to use the user identifier and the participants list to determine whether to update the document information associated with the document identified in said document update request.

38. A user module as defined in claim 33 in which said project information includes a document pointer list comprising a document pointer entry for each document associated with said project, each document pointer entry including a document pointer pointing to document information for said document in said document information store.

39. A user module as defined in claim 33 in which said whiteboard display module is further configured to selectively display project information associated with said project.

40. A user module as defined in claim 39 in which
 A. said whiteboard display module is further configured to enable said interface module to request project information related to said project from said document information store, and to display project information provided thereto by the interface module,
 B. the interface module is further configured to in response generate a project information retrieval request for transmission to said document information store, and provide project information received from said document information store to the whiteboard display module for display; and
 C. the document information store is further configured to, in response to a project information request relating to said project, provide at least some of the project information associated with said project to the user module associated with the interface module which generated the project information request.

41. A user module as defined in claim 40 in which the at least some of the project information includes a document list identifying at least one document associated with said project.

42. A user module as defined in claim 41 in which said whiteboard display module is further configured to receive document selection information from said user identifying a document identified on said document list, and in response thereto to enable the interface module to enable retrieval of document information associated with the identified document for display by said whiteboard display module.

43. A user module as defined in claim 40 in which at least some of the project information includes a project title, the whiteboard display module being configured to display said project title on said whiteboard.

44. A user module as defined in claim 28 in which said whiteboard display module is configured to display the document by displaying the placeholder nodes in the tree structure.

45. A user module as defined in claim 44 in which said at least one document is associated with a document title, the document information associated with said document including said document title.

46. A user module as defined in claim 44 in which said document information associated with said at least one document includes a plurality of placeholder node headers associated with each placeholder node associated with the document.

47. A user module as defined in claim 46 in which:
 A each placeholder node header is configured to include respective inter-placeholder node pointers pointing to another placeholder node in the tree structure thereby to organize placeholder nodes associated with the document in the tree structure; and
 B. said whiteboard display module is configured to use the inter-placeholder node pointers of the placeholder node headers to organize the placeholder nodes as displayed thereby in the tree structure.

48. A user module as defined in claim 47 in which
 A. one of said placeholder nodes is a root placeholder node in the tree structure;
 B. said at least one document includes a document header configured to include a root placeholder node pointer pointing to the placeholder node header in the associated with the root placeholder node; and
 C. said document information store is configured to use the root placeholder node pointer from the document header associated with the document whose document information is to be retrieved to identify the placeholder node header associated with the root placeholder node for the document whose document information is to be retrieved, and to use the inter-placeholder node pointers in the respective placeholder node headers to identify placeholder node headers associated with the document during a retrieval thereof.

49. A user module as defined in claim 46 in which said document content elements comprise notecards, and further in which each placeholder node header is configured to have a notecard pointer to one of said notecards.

50. A user module as defined in claim 49 in which:
 A. said whiteboard display module is configured to, in response to an retrieval request from said user relating to a placeholder node, enable the interface to transmit a document content element request for the placeholder node whose document content is to be retrieved; and
 B. said document information store is configured to provide the notecard pointed to by the notecard pointer of the placeholder node whose document content element was requested in the document content element request for display by said whiteboard display module.

51. A user module as defined in claim 50 in which the document content element request as transmitted by the interface includes a pointer to the placeholder node header of the placeholder node whose associated document content element is to be provided, and further in which the document information store is configure to use the placeholder node pointer to identify the placeholder node header and thereafter use the notecard pointer obtained therefrom to identify the notecard comprising the document content element.

52. A user module as defined in claim 50 in which the document content element request as transmitted by the interface includes a pointer to the notecard to be provided, and further in which the document information store is configure to use the notecard pointer to identify the notecard comprising the document content element.

53. A user module as defined in claim 28 in which document information associated with said at least one document includes a checked out flag having a plurality of conditions, the document information store selectively permitting a user to update said at least one document based on the condition of the checked out flag.

54. A user module as defined in claim 28 in which in which document content information associated with said at least one document includes a checked out flag having a plurality of conditions, the document information store selectively permitting a user to update said document content information based on the condition of the checked out flag.

55. A computer program product for use in connection with a computer to provide a user module for use in connection with a system for facilitating collaboration among a plurality of users in connection with generation of a document, the system comprising a document information store configured to store document information relating to at least one document, the document information including both document structure information and document content information,
- i. the document structure information describing document structural elements for said at least one document, document structural information for said at least one document comprises a plurality of placeholder nodes organized in a tree structure and said document content elements comprises notecards, each placeholder node being configured to have a pointer to one of said notecards,
- ii. the document content information comprising document content elements associated with respective document structural elements;

the user module being associated with one of said users, the computer program product comprising a computer readable medium having encoded thereon:
- A. a whiteboard display module configured to enable the computer to display a whiteboard to said user, the whiteboard selectively displaying document structure defined by the document structural elements for said at least one document and said document content information therefor;
- B. a document update module configured to enable the computer to enable said user to selectively update the document structure and said document content information therefor as displayed by said whiteboard display module; and
- C. an interface module configured to enable the computer to selectively enable the retrieval of document information for said at least one document and document content information as requested by said operator for display by said whiteboard display module and update of document information as stored in said document information store to be updated in response to updates received by said document update module.

56. A computer program product as defined in claim 55 in which said document information store stores said document information relating to a plurality of documents.

57. A computer program product as defined in claim 56 in which in which said document structure as defined by document structural information for each document comprises a plurality of placeholder nodes organized in a tree structure and said document content elements comprises notecards, each placeholder node being configured to enable the computer to have a pointer to one of said notecards.

58. A computer program product as defined in claim 57 in which a plurality of placeholder nodes can have pointers pointing to one of said notecards.

59. A computer program product as defined in claim 56 in which each document is associated with a project, each project being configured to be associated with a plurality of documents.

60. A computer program product as defined in claim 59 in which said document information store is further configured to store project information relating to each said project, said project information including a pointer to document structure information relating to each document associated with said project.

61. A computer program product as defined in claim 60 in which said project information associated with at least one project further includes a participants list configured to identify each user authorized to access content information associated with each document associated with each project.

62. A computer program product as defined in claim 61 in which:
- A. said interface module, to enable retrieval of document information for a document associated with a project, is configured to enable the computer to generate a document retrieval request for transmission to said document information store, said document retrieval request including a user identifier, and
- B. said document information store is configured to use the user identifier and the participants list to determine whether to provide document information requested in said document retrieval request to the user module associated with the interface module which generated said retrieval request, and, in response to a positive determination, provide the document information to that user module.

63. A computer program product as defined in claim 62 in which said project information associated with said at least one project further includes security information the document information store being further configured to use the security information to determine whether to provide document information requested in said retrieval request to the user module associated with the interface module which generated said retrieval request.

64. A computer program product as defined in claim 61 in which:
- A. said interface module, to enable update of document information for a document associated with a project, is configured to enable the computer to generate a document update request for transmission to said document information store, said document update request including a user identifier, and
- B. said document information store is configured to use the user identifier and the participants list to determine whether to update the document information associated with the document identified in said document update request.

65. A computer program product as defined in claim 60 in which said project information includes a document pointer list comprising a document pointer entry for each document associated with said project, each document pointer entry including a document pointer pointing to document information for said document in said document information store.

66. A computer program product as defined in claim 60 in which said whiteboard display module is further configured to enable the computer to selectively display project information associated with said project.

67. A computer program product as defined in claim 66 in which
- A. said whiteboard display module is further configured to enable the computer to enable said interface module to request project information related to said project from said document A information store, and to display project information provided thereto by the interface module,
- B. the interface module is further configured to enable the computer to in response generate a project information retrieval request for transmission to said document information store, and provide project information received from said document information store to the whiteboard display module for display; and
- C. the document information store is further configured to, in response to a project information request relating to said project, provide at least some of the project information associated with said project to the user module associated with the interface module which generated the project information request.

68. A computer program product as defined in claim 67 in which the at least some of the project information includes a document list identifying at least one document associated with said project.

69. A computer program product as defined in claim 68 in which said whiteboard display module is further configured to enable the computer to receive document selection information from said user identifying a document identified on said document list, and in response thereto to enable the interface module to enable retrieval of document information associated with the identified document for display by said whiteboard display module.

70. A computer program product as defined in claim 67 in which at least some of the project information includes a project title, the whiteboard display module being configured to enable the computer to display said project title on said whiteboard.

71. A computer program product as defined in claim 55 in which the whiteboard display module is configured to enable the computer to display the document by displaying the placeholder nodes in the tree structure.

72. A computer program product as defined in claim 71 in which said at least one document is associated with a document title, the document information associated with said document including said document title.

73. A computer program product as defined in claim 71 in which said document information associated with said at least one document includes a plurality of placeholder node headers associated with each placeholder node associated with the document.

74. A computer program product as defined in claim 73 in which:
   A each placeholder node header is configured to include respective inter-placeholder node pointers pointing to another placeholder node in the tree structure thereby to organize placeholder nodes associated with the document in the tree structure; and
   B. said whiteboard display module is configured to enable the computer to use the inter-placeholder node pointers of the placeholder node headers to organize the placeholder nodes as displayed thereby in the tree structure.

75. A computer program product as defined in claim 74 in which
   A. one of said placeholder nodes is a root placeholder node in the tree structure;
   B. said at least one document includes a document header configured to include a root placeholder node pointer pointing to the placeholder node header in the associated with the root placeholder node; and
   C. said document information store is configured to use the root placeholder node pointer from the document header associated with the document whose document information is to be retrieved to identify the placeholder node header associated with the root placeholder node for the document whose document information is to be retrieved, and to use the inter-placeholder node pointers in the respective placeholder node headers to identify placeholder node headers associated with the document during a retrieval thereof.

76. A computer program product as defined in claim 73 in which said document content elements comprise notecards, and further in which each placeholder node header is configured to have a notecard pointer to one of said notecards.

77. A computer program product as defined in claim 76 in which:
   A. said whiteboard display module is configured to enable the computer to, in response to an retrieval request from said user relating to a placeholder node, enable the interface to transmit a document content element request for the placeholder node whose document content is to be retrieved; and
   B. said document information store is configured to provide the notecard pointed to by the notecard pointer of the placeholder node whose document content element was requested in the document content element request for display by said whiteboard display module.

78. A computer program product as defined in claim 77 in which the document content element request as transmitted by the interface includes a pointer to the placeholder node header of the placeholder node whose associated document content element is to be provided, and further in which the document information store is configure to use the placeholder node pointer to identify the placeholder node header and thereafter use the notecard pointer obtained therefrom to identify the notecard comprising the document content element.

79. A computer program product as defined in claim 77 in which the document content element request as transmitted by the interface includes a pointer to the notecard to be provided, and further in which the document information store is configure to use the notecard pointer to identify the notecard comprising the document content element.

80. A computer program product as defined in claim 55 in which document information associated with said at least one document includes a checked out flag having a plurality of conditions, the document information store selectively permitting a user to update said at least one document based on the condition of the checked out flag.

81. A computer program product as defined in claim 55 in which in which document content information associated with said at least one document includes a checked out flag having a plurality of conditions, the document information store selectively permitting a user to update said document content information based on the condition of the checked out flag.

* * * * *